US008792918B2

(12) United States Patent
Isomae

(10) Patent No.: US 8,792,918 B2
(45) Date of Patent: Jul. 29, 2014

(54) PAGING SYSTEM

(75) Inventor: Nami Isomae, Tokyo (JP)

(73) Assignee: NEC Corporation, Tokyo (JP)

( * ) Notice: Subject to any disclaimer, the term of this patent is extended or adjusted under 35 U.S.C. 154(b) by 359 days.

(21) Appl. No.: 11/635,682

(22) Filed: Dec. 8, 2006

(65) Prior Publication Data

US 2007/0082685 A1 Apr. 12, 2007

Related U.S. Application Data

(62) Division of application No. 10/069,957, filed as application No. PCT/JP00/06149 on Sep. 8, 2000, now Pat. No. 7,450,956.

(30) Foreign Application Priority Data

Sep. 8, 1999 (JP) .................................... 11-253725
May 18, 2000 (JP) ................................. 2000-146713

(51) Int. Cl.
*H04W 68/00* (2009.01)
*H04W 68/02* (2009.01)
*H04W 88/06* (2009.01)
*H04W 92/02* (2009.01)

(52) U.S. Cl.
CPC .............. *H04W 68/00* (2013.01); *H04W 68/02* (2013.01); *H04W 88/06* (2013.01); *H04W 92/02* (2013.01)
USPC ....................................... 455/458; 455/426.1

(58) Field of Classification Search
CPC ... H04W 68/00; H04W 68/02; H04W 68/025; H04W 52/02; H04W 68/12; H04W 84/14; H04W 92/02; H04W 52/0216; H04W 88/06; H04W 88/02
USPC ............. 455/458, 426.1, 456.1, 574; 370/311
See application file for complete search history.

(56) References Cited

U.S. PATENT DOCUMENTS 5,884,144 A 3/1999 Chavez, Jr. et al.
5,999,521 A 12/1999 Thompson
(Continued)

FOREIGN PATENT DOCUMENTS

JP 1-316050 12/1989
JP 4-042695 2/1992
(Continued)

OTHER PUBLICATIONS

Sophia Antipolis, Content in the Paging Message, NEC, 3$^{rd}$ Generation partnership Project (3GPP), 1999, 2 pages.

(Continued)

*Primary Examiner* — Ajit Patel
(74) *Attorney, Agent, or Firm* — Foley & Lardner LLP

(57) ABSTRACT

A radio network controller that serves to reduce the amount of processes for searching for a common ID in a paging procedure when performing a paging processing for simultaneously calling a mobile station. A search-not-required flag indicating whether or not a search for the common ID is required is added to a message from a core network. The radio network controller determines whether or not a search for the common ID is required based on the status of the flag and the type of the message from the core network. A search for the common ID is required if the flag is "OFF," whereas if the flag is "ON" and if the message is paging 1, it is determined that an RRC connection has not been established for the mobile station and thus a search for the common ID is not required in the radio network controller.

19 Claims, 24 Drawing Sheets

(56) References Cited

U.S. PATENT DOCUMENTS

| | | | |
|---|---|---|---|
| 6,188,911 | B1 | 2/2001 | Wallentin et al. |
| 6,230,009 | B1 | 5/2001 | Holmes et al. |
| 6,259,925 | B1 * | 7/2001 | Josse .................... 455/466 |
| 6,549,897 | B1 | 4/2003 | Katariya et al. |
| 7,089,023 | B2 * | 8/2006 | Vialen et al. ............ 455/458 |
| 2002/0019241 | A1 | 2/2002 | Vialen et al. |
| 2002/0086685 | A1 * | 7/2002 | Wallentin et al. ....... 455/458 |
| 2003/0013443 | A1 | 1/2003 | Willars et al. |
| 2003/0039237 | A1 * | 2/2003 | Forslow .................. 370/352 |
| 2005/0083876 | A1 | 4/2005 | Vialen et al. |

FOREIGN PATENT DOCUMENTS

| | | |
|---|---|---|
| JP | 9-168053 | 6/1997 |
| JP | 10-257187 | 9/1998 |
| JP | 11-055753 | 2/1999 |
| JP | 11-205387 | 7/1999 |
| JP | 2001-517000 | 10/2001 |
| JP | 2002-527965 | 8/2002 |
| JP | 2003-509981 | 3/2003 |
| JP | 3419386 | 4/2004 |
| WO | WO 99/17579 | 4/1999 |

OTHER PUBLICATIONS $3^{rd}$ Generation Partnership Project (3GPP); Technical Specification Group (TSG) RAN UTRAN Iu Interface RANAP Signalling, 3G TS 25.413 V1.0.2, 1999, 46 pages.

* cited by examiner

| CONVENTIONAL PAGING MESSAGE | |
|---|---|
| INFORMATION ELEMENTS | COMMON ID |
| | TMSI |
| | CELL ID LIST |
| BETWEEN CORE NETWORK AND RADIO NETWORK CONTROLLER | CONNECTIONLESS SCCP |

FIG. 1

| COMMON ID | PRESENCE/ABSENCE OF RRC CONNECTION |
|---|---|
| 0X00000000 | O |
| 0X00000001 | × |
| 0X00000002 | O |
| ⋮ | |
| 0X11110000 | × |
| 0X11110001 | O |
| ⋮ | |
| 0Xffffffff | × |

| PAGING 1 MESSGAE | |
|---|---|
| INFORMATION ELEMENTS | COMMON ID |
| | TMSI |
| | CELL ID LIST |
| | CO-ORDINATION FUNCTION PRESENCE/ABSENCE FLAG |
| BETWEEN CORE NETWORK AND RADIO NETWORK CONTROLLER | CONNECTIONLESS SCCP |

FIG. 5

| PAGING 2 MESSAGE | |
|---|---|
| INFORMATON ELEMENTS | NONE |
| BETWEEN CORE NETWORK AND RADIO NETWORK CONTROLLER | CONNECTION ORIENTED SCCP |

FIG. 6

| PAGING 1' MESSAGE | |
|---|---|
| INFORMATION ELEMENTS | COMMON ID |
| | TMSI |
| | CELL ID LIST |
| | SEARCH-NOT-REQUIRED FLAG |
| BETWEEN CORE NETWORK AND RADIO NETWORK CONTROLLER | CONNECTIONLESS SCCP |

FIG. 16

| PAGING 2 MESSAGE | |
|---|---|
| INFORMATION ELEMENTS | NONE |
| BETWEEN CORE NETWORK AND RADIO NETOWRK CONTROLLER | CONNECTION ORIENTED SCCP |

FIG. 17

| PAGING 2' MESSAGE | |
|---|---|
| INFORMATION ELEMENTS | CONNECTION ID |
| BETWEEN CORE NETWORK AND RADIO NETWORK CONTROLLER | CONNECTIONLESS SCCP |

FIG. 24

| CASE | CO-ORDINATION FUNCTION | MESSAGE FROM CORE TO BASE STATION | CONNECTION FROM CORE TO BASE STATION | SEARCH-NOT-REQUIRED FLAG | SEARCH FOR COMMON ID | CHANNEL FROM BASE STATION TO MOBILE STATION |
|---|---|---|---|---|---|---|
| 1 | ABSENT | PAGING 1' | CONNECTION-LESS | OFF | REQUIRED | PAGING CONTROL CHANNEL OR DEDICATED CONTROL CHANNEL |
| 2 | PRESENT | PAGING 1' | CONNECTION-LESS | ON | NOT REQUIRED | PAGING CONTROL CHANNEL |
| 3 | PRESNT | PAGING 2 | CONNECTION ORIENTED | / | NOT REQUIRED | DEDICATED CONTROL CHANNEL |
| 4 | PRESENT | PAGING 2' | CONNECTION-LESS | / | NOT REQUIRED | DEDICATED CONTROL CHANNEL |
| 5 | PRESENT | PAGING 1' | CONNECTION-LESS | OFF | REQUIRED | DEDICATED CONTROL CHANNEL |

FIG. 27

PAGING SYSTEM

CROSS-REFERENCE TO RELATED PATENT APPLICATIONS

This application is a division of application Ser. No. 10/069,957, filed Mar. 7, 2002, which is a National Stage of PCT/JP00/06149, filed Sep. 8, 2000, now pending, and which claims priority from Japanese Patent Applications No. 11-253725 filed Sep. 8, 1999; and 2000-146713 filed May 18, 2000, by Nami Isomae, all of which are incorporated herein by reference in their entirety. This application claims only subject matter disclosed in the parent application and therefore presents no new matter.

BACKGROUND OF THE INVENTION

1. Technical Field

The present invention relates to radio network controllers, and paging systems and paging methods using the same, and particularly relates to a radio network controller that performs a simultaneous call for finding the location of a mobile station from base stations according to the paging procedure of the RANAP (Radio Access Network Application Part) protocol, and a paging system and a paging method using the same.

2. Background Art

Generally, the paging procedure of the RANAP protocol is performed as follows. That is, when a paging command is transmitted from a core network (CN) including a mobile switching center (MSC) to a radio network controller (RNC), the radio network controller, in response to the command, performs a paging processing for simultaneously calling a mobile station. In this case, if the range of common ID, that is, the number of mobile stations which the system accommodates, is large, a large amount of processes is incurred at the radio network controller. For this reason, reduction of the amount of processes has been a concern for years.

Accordingly, a method is considered in which the amount of processes is reduced by improving the process of searching for connections based on the RRC (Radio Resource Control) protocol (hereinafter referred to as "RRC connection"), which is performed based on the common ID at each time of paging. The common ID is identification information for identifying a mobile station.

An example of the common ID is IMSI (International Mobile Subscriber Identifier). IMSI is four bytes in length and therefore has a maximum value of $2^{32}$ (approximately $4.3 \times 10^9$). Thus, searching IMSI at each time of paging incurs a considerably large load.

FIG. 1 shows a conventional paging message (paging message from a core network to a radio network controller, hereinafter referred to as "paging message (core to base)"). According to the conventional paging procedure, upon receiving a paging message (core to base), the radio network controller transmits the paging message via a radio paging control channel (PCCH) or a dedicated control channel (DCCH).

In this case, in order to determine whether to use the radio paging control channel or the dedicated control channel for transmission, the radio network controller searches whether an RRC connection has already been established for a targeted receiving mobile station using a common ID in the message as a key. A paging message (paging message from the radio network controller to the mobile station, hereinafter referred to as "paging message (base to mobile)") is transmitted via the paging control channel if an RRC connection has not been established and via the dedicated control channel if an RRC connection has been established. This is because although the paging message (base to mobile) is transmitted via the radio paging control channel to a mobile station that is not busy in a communication, a mobile station that is busy in a communication does not allow the message to be received via the paging control channel and thus the paging message (base to mobile) must be transmitted via the dedicated control channel using an RRC connection that has already been established.

Next, the above paging processing will be described with further reference to FIGS. 2 and 3.

FIG. 2 is a diagram showing a paging sequence by which a paging processing is performed to simultaneously call a mobile station 300 from a core network 100 via a radio network controller 200. Referring to the figure, it is to be assumed that the core network 100 includes a mobile switching center that is not shown, and a connection is set up between the mobile switching center and the radio network controller 200 by the SCCP (Signalling Connection Control Part) protocol. The radio network controller 200 controls base stations that are not shown, and a connection is set up between the base stations and the mobile station 300 based on the RRC protocol.

Referring to the figure, a paging message (core to base) 11 of the RANAP protocol is transmitted from the core network 100 to the radio network controller 200 by the connectionless SCCP protocol. It is to be assumed that the paging message (core to base) 11 includes a common ID for identifying a mobile station.

The radio network controller 200 searches whether an RRC connection has already been set up for the mobile station 300 designated by a common ID information element in the paging message (core to base) 11. In this case, the search is performed using a table shown in FIG. 3, that is, a table indicative of associations between common IDs and RRC connections (step 21 in FIG. 2).

Referring now to FIG. 3, for example, if the common ID=0x11110000, "RRC connection is absent" and "search fails" (indicated by a x mark), and a paging 1 message (base to mobile) 12 of the RRC protocol is transmitted to the mobile station 300 via the paging control channel PCCH. Hereinafter, the paging 1 message (base to mobile) transmitted via the paging control channel PCCH will be referred to as "paging 1 message (PCCH)." If the common ID=0x11110001, "RRC connection is present" and "search succeeds" (indicated by a circle mark). It is to be assumed that if "search succeeds," information indicating which RRC connection is relevant is written in the table (not shown). A paging 2 message (base to mobile) 13 is transmitted using a dedicated control channel DCCH identified by the search result. Hereinafter, the paging 2 message (base to mobile) transmitted via the dedicated control channel DCCH will be referred to as "paging 2 message (DCCH)."

Next, the core network 100 will be described. The radio network controller 200 can be connected to two types of core network as follows:

(1) Separated Core Network

Nodes with packet service function and nodes with circuit service function are physically separated.

(2) Combined Core Network

Packet service function and circuit service function are combined within a single node. Furthermore, the combined core networks are divided into two types as follows depending on the presence/absence of coordination function:

(2.1) Combined Core Network without Coordination Function

Packet service function and circuit service function physically reside within a single node. However, the functions operate individually.

(2.2) Combined Core Network with Coordination Function

Packet service function and circuit service function are coordinated.

The combined core network with coordination function is capable of recognizing whether a mobile station that is targeted by a paging request already has an RRC connection. For example, when a request for receiving a circuit switched call is issued to a mobile station, within the core network, a circuit service function unit is capable of querying a packet service function unit as to whether a packet call is currently established. It is determined that an RRC connection has been established if a packet call has already been established and that an RRC connection has not been established if a packet call has not been established.

As shown in FIG. 4, SCCP resides in a layer above MTP (Message Transfer Part) and below RANAP. SCCP services are either "connectionless," in which a connection is not set up and a communication is performed on a one-time basis, or "connection oriented," in which a connection is set up in advance and a communication is performed using the connection that has been set up.

In the paging sequence described above, even if the core network determines "RRC connection is present," no means are provided to transmit it to the radio network controller. Accordingly, the radio network controller performs a search using the common ID unconditionally in response to a paging request. Thus, the paging procedure at the radio network controller suffers from the drawback that a large amount of processes is incurred in order to search for the common ID.

Prior arts related to the present invention are known. For example, Japanese Unexamined Patent Publication Tokkai No. Hei 1-316050 achieves, by improving an application for a switch, a connection method with immediacy for a connection between a calling subscriber and a receiving subscriber who is called. However, the publication only discloses technical ideas regarding a system for calling a receiving subscriber with a pager, and is completely different from the present invention, which relates to a simultaneous call for finding the location of a mobile station from base stations.

Also, Japanese Unexamined Patent Publication Tokkai No. Hei 9-168053 discloses a method for communicating maintenance information to a remote apparatus including a remote processor and a pager circuit. However, the publication is also completely different from the present invention, which relates to a simultaneous call for finding the location of a mobile station from base stations.

The present invention has been made in order to overcome the drawback of the conventional art described above, and an object thereof is to provide a radio network controller that serves to reduce the amount of processes for searching for a common ID in a paging procedure, and a paging system and a paging method using the same.

SUMMARY OF THE INVENTION

Disclosure of Invention

A radio network controller according to the present invention is a radio network controller in a paging system that performs a paging processing for simultaneously calling a mobile station in response to a paging command from a core network, wherein a flag indicating whether or not a mobile switching center of said core network has the function of coordinating a packet service and a circuit service is added to said paging command, and said radio network controller comprises determination means for determining whether or not said flag indicates that said coordinating function is present; and paging processing means for performing said paging processing using one of a paging control channel and a dedicated control channel depending on the connection status between said core network and said radio network controller if said flag is determined as indicating the presence of said coordinating function. In performing said paging processing, said paging control channel is used if the connection status between said core network and said radio network controller is connectionless, and said dedicated control channel is used if the connection status between said core network and said radio network controller is connection oriented. Said paging command may further include a connection ID for identifying a connection between said radio network controller and a mobile station that is in a communication, so that said paging processing is performed using the dedicated control channel by identifying the connection by said connection ID.

Furthermore, a paging system according to the present invention is a paging system that performs a paging processing for simultaneously calling a mobile station from a radio network controller in response to a paging command from a core network, wherein said radio network controller comprises paging processing means for performing said paging processing using one of a paging control channel and a dedicated control channel depending on whether or not a mobile switching center of said core network has the function of coordinating a packet service and a circuit service. If the mobile switching center of said core network has the function of coordinating a packet service and a circuit service, a search for a common ID is not required at said radio network controller. Thus, said radio network controller serves to reduce the amount of processes for searching for a common ID in a paging procedure.

Furthermore, a paging method according to the present invention is a paging method that performs a paging processing for simultaneously calling a mobile station from a radio network controller in response to a paging command from a core network, wherein said method comprises a paging processing step of performing, in said radio network controller, said paging processing using one of a paging control channel and a dedicated control channel depending on whether or not a mobile switching center of said core network has the function of coordinating a packet service and a circuit service.

In sum, the present invention provides means for reducing the amount of processes for searching for a common ID in a paging procedure at a radio network controller. For the purpose of the reduction in the amount of the processes, the present invention provides two types of paging message of the RANAP protocol, as will be described later. By providing the two types of paging message, unnecessary processes for searching for a common ID is saved at the radio network controller.

BRIEF DESCRIPTION OF THE DRAWINGS

FIG. 1 is a diagram showing a conventional paging message (core to base).

FIG. 5 is a diagram showing the contents of a paging 1 message (core to base) in a paging system according to a first embodiment of the present invention.

FIG. 6 is a diagram showing the contents of a paging 2 message (core to base) in the paging system according to the first embodiment of the present invention.

FIG. 16 is a diagram showing the contents of a paging 1' message (core to base) in a paging system according to a third embodiment of the present invention.

FIG. 17 is a diagram showing the contents of a paging 2 message (core to base) in the paging system according to the third embodiment of the present invention.

FIG. 24 is a diagram showing a paging 2' sequence (core to base) in a paging system according to a fourth embodiment of the present invention.

FIG. 27 is a diagram showing the operations of the paging systems according to the third and the fourth embodiments of the present invention.

DETAILED DESCRIPTION OF THE PREFERRED EMBODIMENTS

Figure 2:
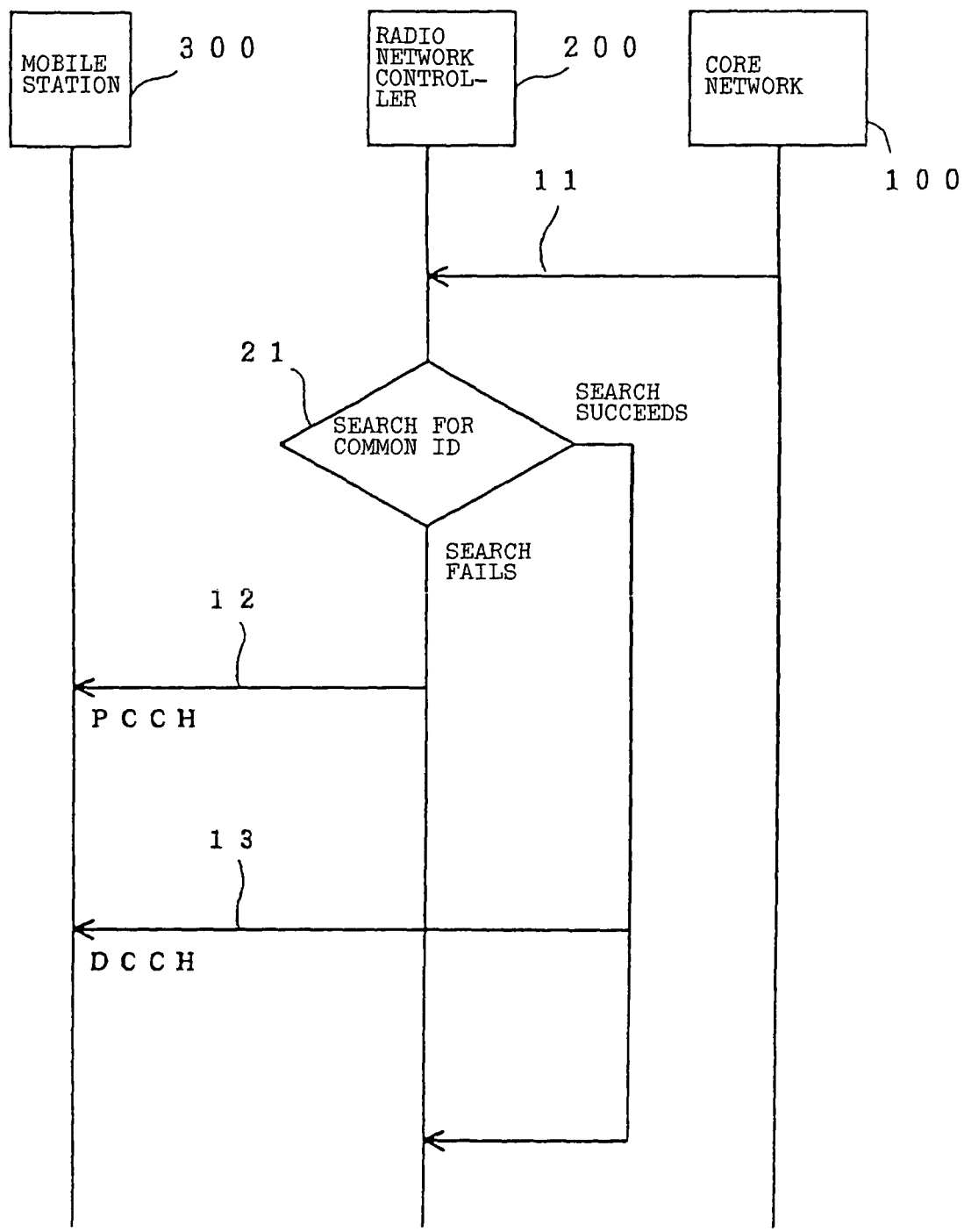
FIG. 2 is a diagram showing a paging sequence in a conventional paging system.

Best Mode for Carrying Out the Invention

For more detailed description, the present invention will be described with reference to the accompanying drawings. In the drawings to be referenced in the following description, parts that are equivalent to those in other drawings are designated by the same symbols.

In a paging system according to a first embodiment of the present invention, two types of message, namely, paging 1 message (core to base) and paging 2 message (core to base), are used as paging messages (core to base) of the RANAP protocol. FIG. 5 shows the configuration of a paging 1 message (core to base), and FIG. 6 shows the configuration of a paging 2 message (core to base), respectively.

In the paging 1 message (core to base) shown in FIG. 5, a "coordination function presence/absence flag" is added to the information elements of the paging message shown in FIG. 1. The coordination function presence/absence flag indicates whether or not the mobile switching center of the core network has the function of coordinating packet service and circuit service.

The paging 2 message (core to base) shown in FIG. 6 is a new message that is completely different from the paging message (core to base) shown in FIG. 1. The paging 2 message (core to base) does not have any information element.

A separated core network and a combined core network without coordination function use only the paging 1 message (core to base) (FIG. 5). A core network with coordination function uses both the paging 1 message (core to base) (FIG. 5) and the paging 2 message (core to base) (FIG. 6).

More specifically, the paging 1 message (core to base) (FIG. 5) is used when the first paging (an RRC connection has not been established for the mobile station) is reliably assumed or when a possibility for the first paging exists. On the other hand, the paging 2 message (core to base) (FIG. 6) is used when the second or a subsequent paging (an RRC connection has been established for the mobile station) is reliably assumed.

First, a paging processing from a core network 400 without coordination function will be described with reference to FIG. 7. In the figure, parts that are equivalent to those in FIG. 2 are designated by the same symbols.

Figure 7:
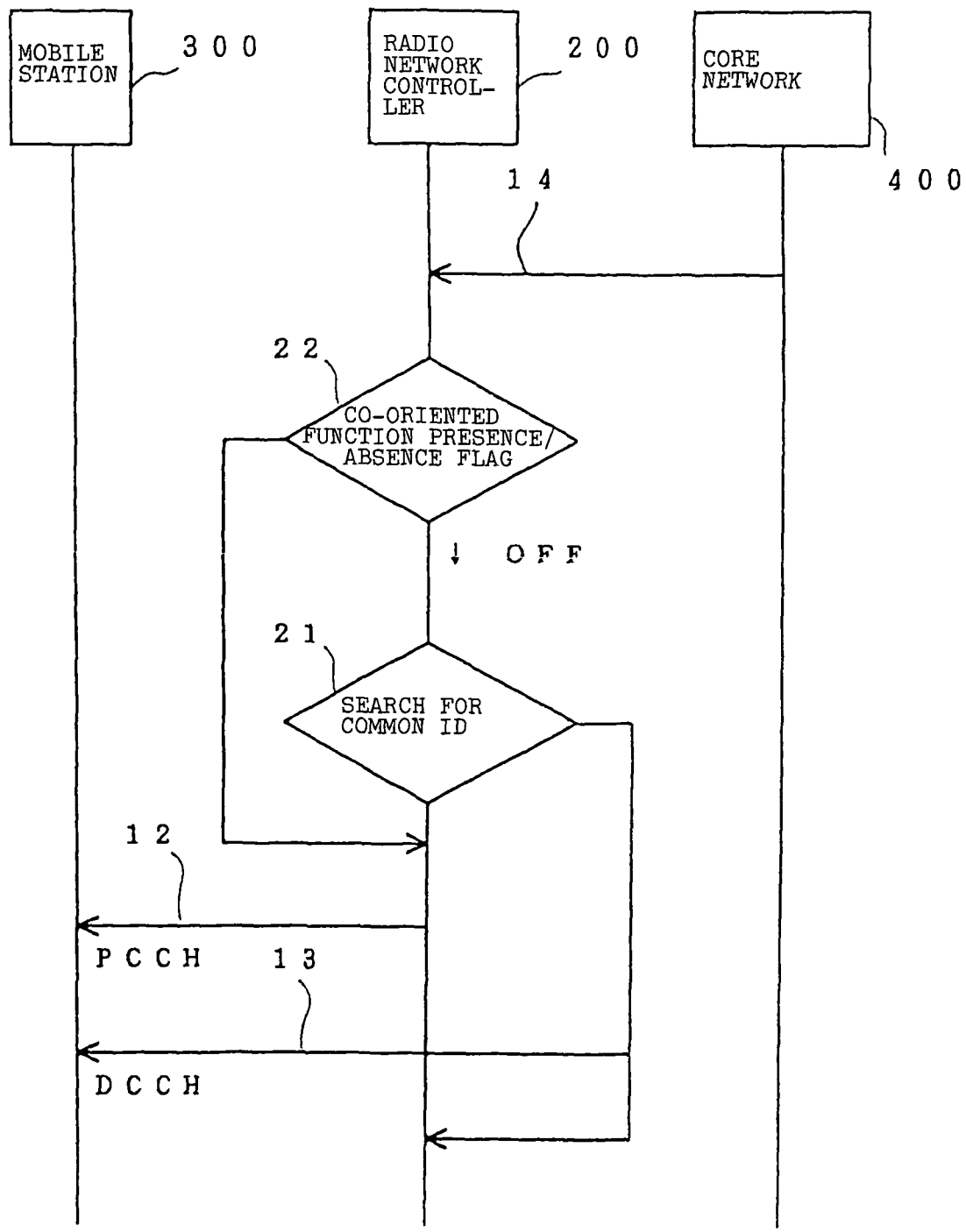
FIG. 7 is a diagram showing a paging 1 sequence in the paging system according to the first embodiment of the present invention.

FIG. 7 shows the operations of the core network 400, the radio network controller 200, and the mobile station 300, and messages exchanged.

The core network 400 without coordination function transmits a paging 1 message (core to base) 14 (FIG. 5) to the radio network controller 200. At this time, the coordination function presence/absence flag in the paging 1 message (core to base) 14 is set to "OFF."

Figures 3, 4:
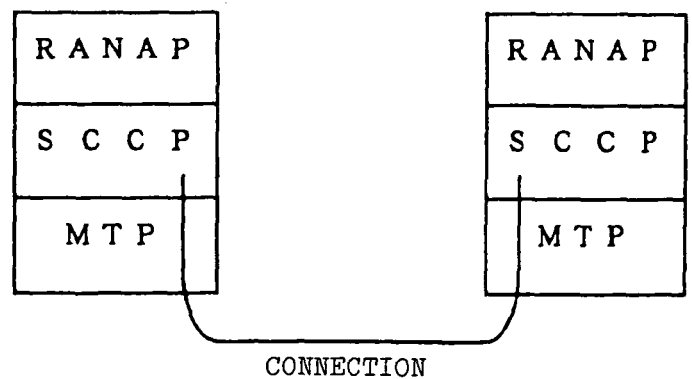
FIG. 3 is a diagram showing a table indicative of associations between common IDs and RRC connections.
FIG. 4 is a diagram showing the relationship between SCCP and other layers.

Upon receiving the paging 1 message (core to base) 14, the radio network controller 200 checks the coordination function presence/absence flag in the message (step 22 in FIG. 7). Inasmuch as the coordination function presence/absence flag is "OFF," a next common ID is searched for and checked (step 21 in FIG. 7). The subsequent sequence is similar as that in the conventional system. In this case, the presence/absence of an RRC connection is determined based on the table shown in FIG. 3, that is, the table indicative of associations between common IDs and RRC connections, so that a paging 1 message (PCCH) 12 or a paging 2 message (DCCH) 13 of the RRC protocol is transmitted to the mobile station 300.

Next, a paging processing from a core network with coordination function will be described with reference to FIGS. 8 to 11. First, a case where an RRC connection has not been established for a destination mobile station, that is, a case of the first paging message, will be described with reference to FIGS. 8 and 9.

Figure 8:
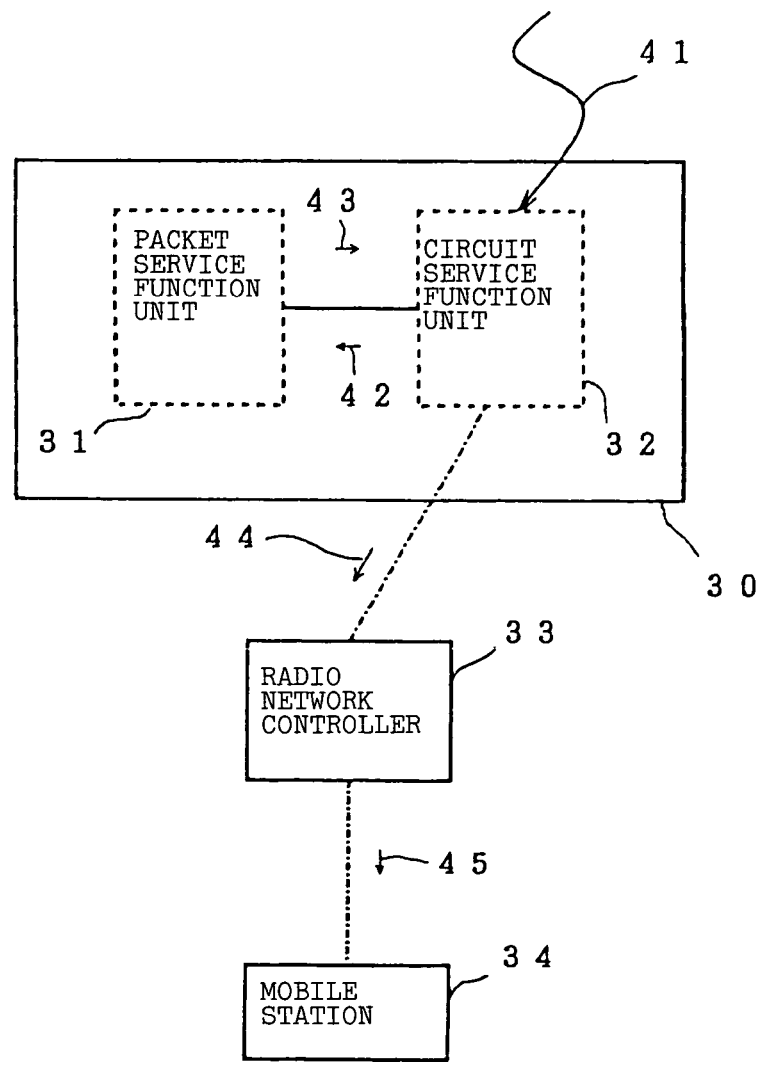
FIG. 8 is a diagram showing a paging sequence from a combined core network.

FIG. 8 shows an example in which a circuit switched call to a mobile station 34 that is not busy in a communication is received. When a circuit switched call is received at a mobile switching center 30 included in a core network 500 (FIG. 9), a circuit service function unit 32 transmits a query 42 as to "whether or not the destination mobile station is busy in a communication" to a packet service function unit 31. Then, the circuit service function unit 32 receives a reply 43 to the effect that "the mobile station 34 is not busy in a communication" from the packet service function unit 31 and recognizes the first paging.

Figure 9:
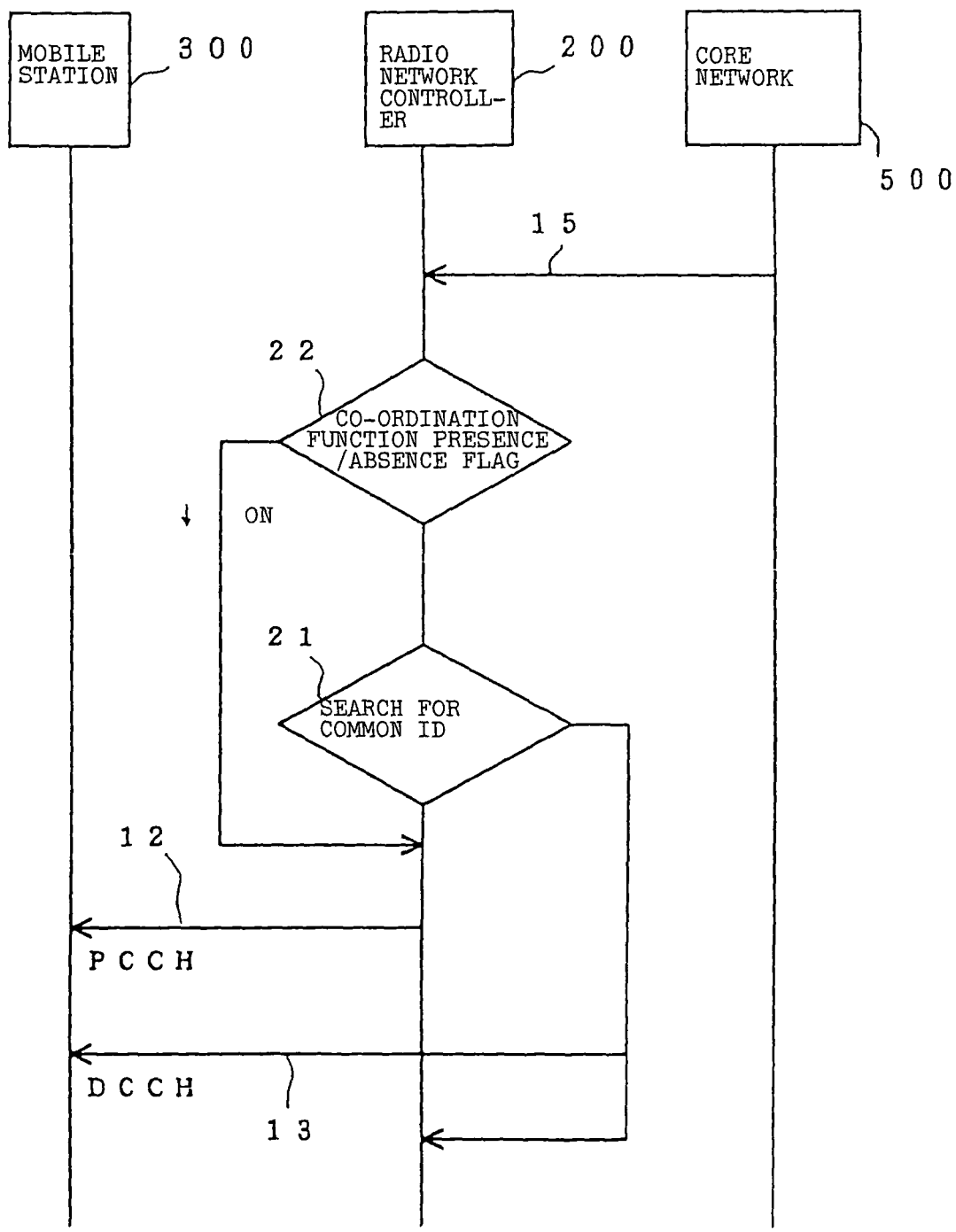
FIG. 9 is a diagram showing a paging 1 sequence in the paging system according to the first embodiment of the present invention.

The circuit service function unit 32 prepares a paging 1 message (core to base), sets the coordination function presence/absence flag "ON" to indicate that a search has already been performed, and transmits the paging 1 message (core to base) 44 (FIG. 5) to a radio network controller 33 by connectionless SCCP. FIG. 9 shows the operation of the radio network controller that has received the paging 1 message (core to base) 44.

Referring to FIG. 9, upon receiving the paging 1 message (core to base) 15 (FIG. 5) from the core network 500, the radio network controller 200 checks the value of the coordination function presence/absence flag in the message (step 22 in FIG. 9). Inasmuch as the coordination function presence/absence flag is "ON," the process of searching for the common ID is skipped, and a paging 1 message (PCCH) 12 of the RRC protocol is transmitted to the mobile station 300 via a paging control channel. Referring back to FIG. 8, the paging 1 message (PCCH) 45 (12 in FIG. 7) has been transmitted from the radio network controller 33 to the mobile station 34.

Next, a case where an RRC connection has already been established for a destination mobile station will be described with reference to FIGS. 10 and 11.

Figure 10:
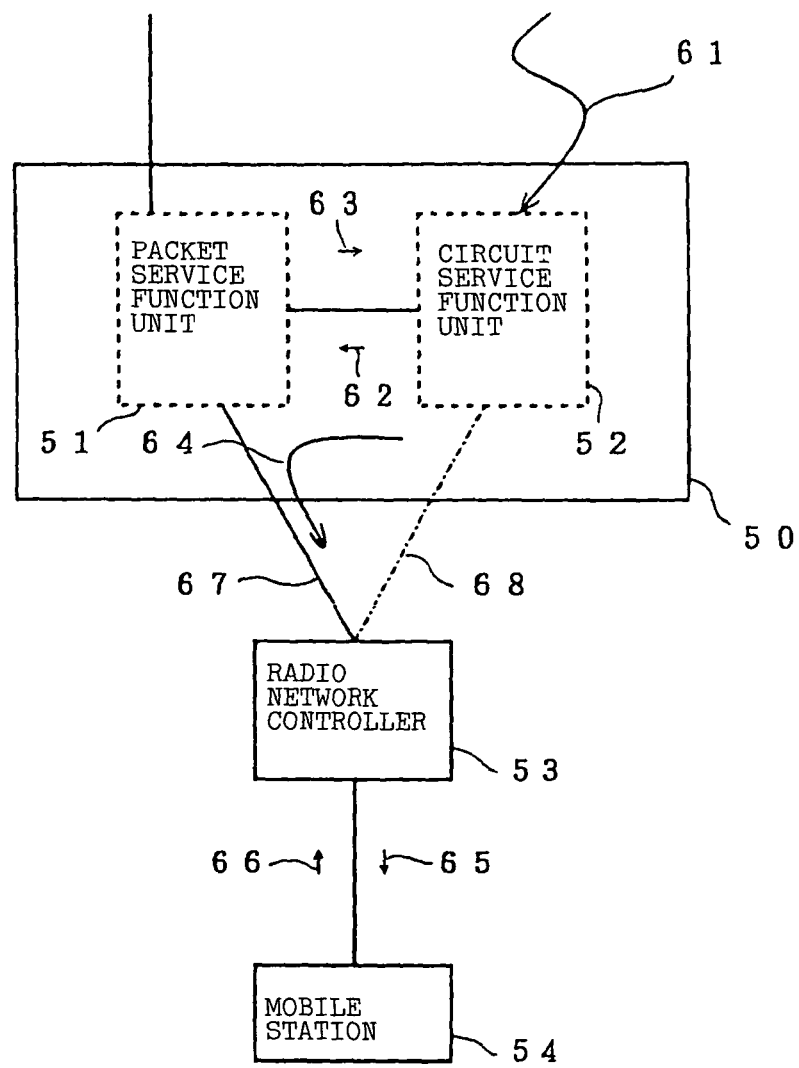
FIG. 10 is a diagram showing a paging sequence from a combined core network.

FIG. 10 shows an example in which a circuit switched call to a mobile station 54 that is busy in a packet service communication is received. When a circuit switched call 61 is received at a mobile switching center 50 included in the core network 500 (FIG. 11), a circuit service function unit 52 transmits a query 62 as to "whether or not the destination mobile station is busy in a communication" to a packet service function unit 51. Then, the circuit service function unit 52 receives a reply 63 to the effect that "the mobile station 54 is busy in a communication" and recognizes that the mobile station 54 has already established an RRC connection. The circuit service function unit 52 prepares a paging 2 message (core to base) (FIG. 6), and transmits the paging 2 message (core to base) 64 (FIG. 6) to a radio network controller 53 in a connection oriented manner with reference to the SCCP connection that has already been established for a packet call between the mobile switching center 50 and the radio network controller 53. FIG. 11 shows the operation of the radio network controller that has received the paging 2 message (core to base) 64.

Figures 11, 12:
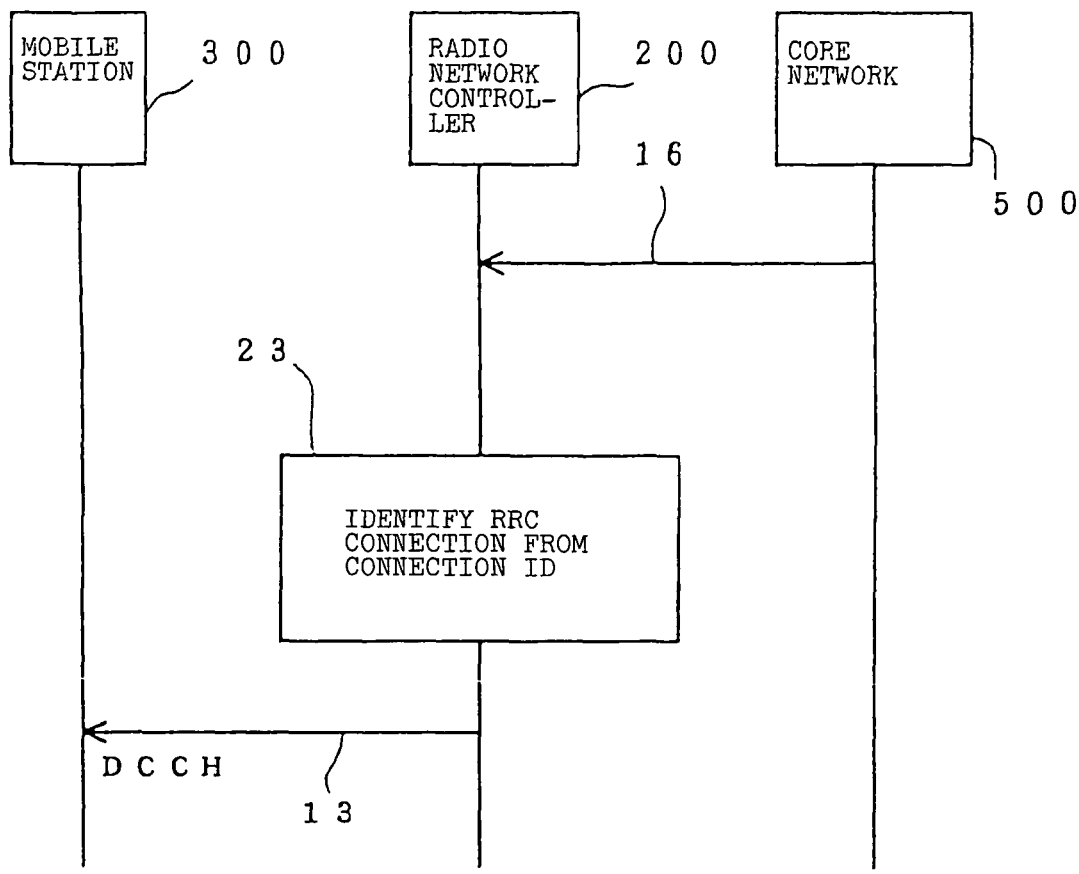
FIG. 11 is a diagram showing a paging 2 sequence in the paging system according to the first embodiment of the present invention.
FIG. 12 is a diagram showing a paging 2' sequence (core to base) in a paging system according to a second embodiment of the present invention.

Referring to FIG. 11, upon receiving the paging 2 message (core to base) 16 (FIG. 6) from the core network 500, the radio network controller 200 identifies the RRC connection for the mobile station 300 from the SCCP connection between the core network 500 and the radio network controller 200 (step 23 in FIG. 11). Then, the radio network controller 200 transmits a paging 2 message (DCCH) 13 of the RRC protocol that has been identified for the mobile station 300 via a dedicated control channel DCCH.

Referring back to FIG. 10, the paging 2 message (DCCH) 65 (13 in FIG. 9) has been transmitted from the radio network controller 53 to the mobile station 54. A response 66 from the mobile station 54 may be returned either using the SCCP connection 67 for a packet call between the mobile switching center 50 and the radio network controller 53 or by a new SCCP connection establishing request 68 for a circuit switched call between the mobile switching center 50 and the radio network controller 53.

As described above, two types of paging message (core to base) with respect to the coordination function of core networks are newly provided so that means are provided for transmitting information recognized by a core network to a radio network controller, allowing the radio network controller to determine whether or not a search for a common ID is required based on the information. Accordingly, the amount of processes for searching for a common ID in a paging procedure at the radio network controller is reduced.

Next, a second embodiment of the present invention will be described with reference to FIGS. 12 to 14.

FIG. 12 shows the configuration of a paging 2' message (core to base) according to the second embodiment of the paging 2 message (core to base). As opposed to the message shown in FIG. 6, the message is transmitted by connectionless SCCP and a connection ID is added to the information elements.

Figure 13:
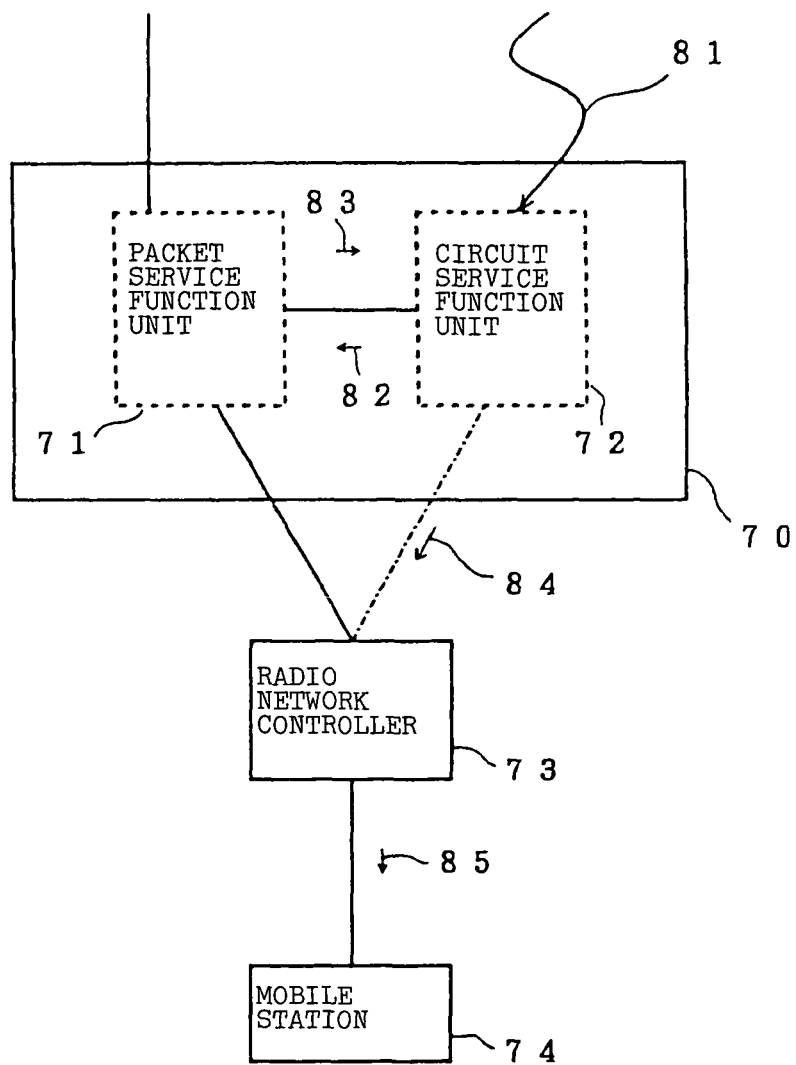
FIG. 13 is a diagram showing a paging sequence from a combined core network.

FIG. 13 shows an example in which a circuit switched call to a mobile station 74 that is busy in a packet service communication is received. When a circuit switched call 81 is received at a mobile switching center 70 included in a core network, a circuit service function unit 72 transmits a query 82 as to "whether or not the destination mobile station is busy in a communication" to a packet service function unit 71. Then, the circuit service function unit 72 receives a reply 83 to the effect that "the mobile station 74 is busy in a communication" from the packet service function unit 71 and recognizes that the mobile station 74 has already established an RRC connection. The circuit service function unit 72 sets a connection ID indicating an SCCP connection that has been established for a packet call between the mobile switching center 70 and a radio network controller 73 in a paging 2' message (core to base) (FIG. 12), and transmits the paging 2' message (core to base) 84 (FIG. 12) in a connectionless manner.

Figure 14:
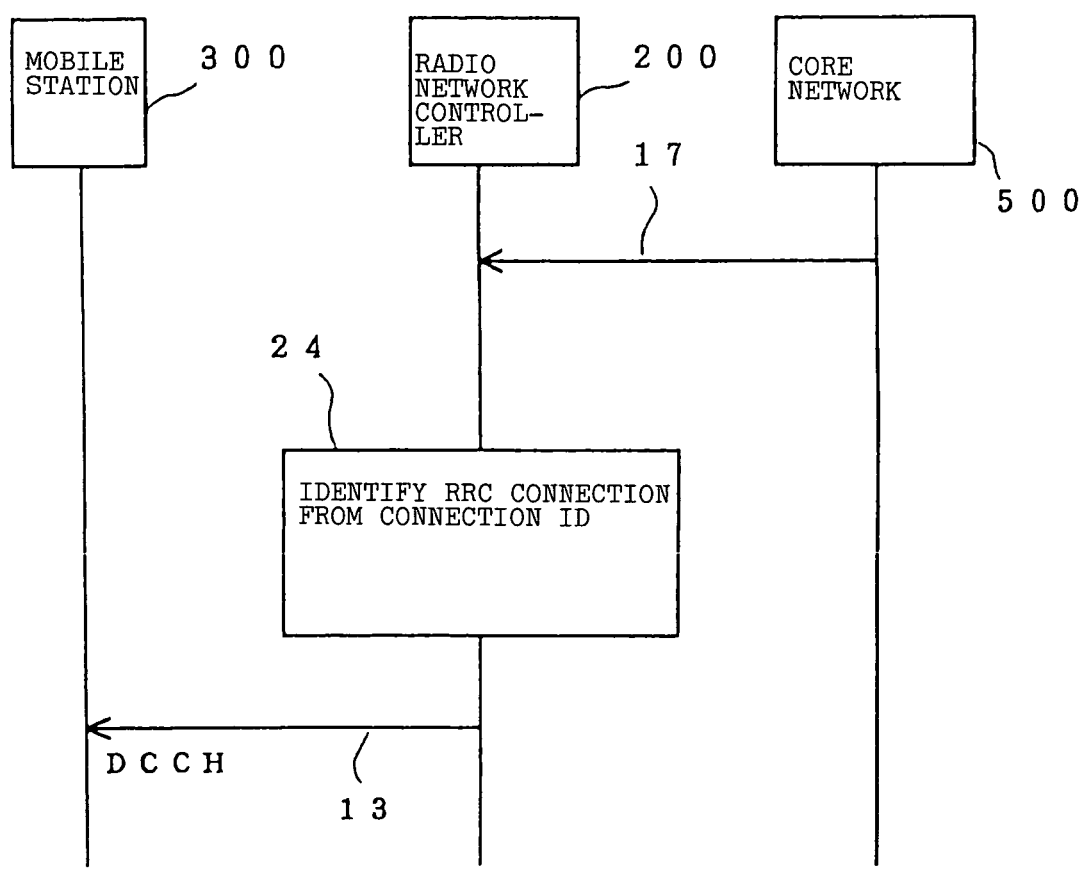
FIG. 14 is a diagram showing a paging 2' sequence in the paging system according to the second embodiment of the present invention.

FIG. 14 shows the operation of the radio network controller that has received the paging 2' message (core to base) 84. Referring to FIG. 14, upon receiving the paging 2' message (core to base) 17 (FIG. 12) from the core network 500, the radio network controller 200 identifies the RRC connection for the mobile station 300 from the connection ID in the message (step 24 in FIG. 14), and transmits a paging 2 message (DCCH) 13 of the RRC protocol to the mobile station 300 via a dedicated control channel DCCH. Referring back to FIG. 13, the paging 2 message (DCCH) 85 (13 in FIG. 14) has been transmitted from the radio network controller 73 to the mobile station 74.

As described above, also in this embodiment, two types of paging message (core to base) are provided so that information recognized by a core network is transmitted to a radio network controller, allowing the radio network controller to determine whether or not a search for a common ID is required based on the information. Accordingly, the amount of processes for searching for a common ID in a paging procedure at the radio network controller is reduced.

Figure 15:
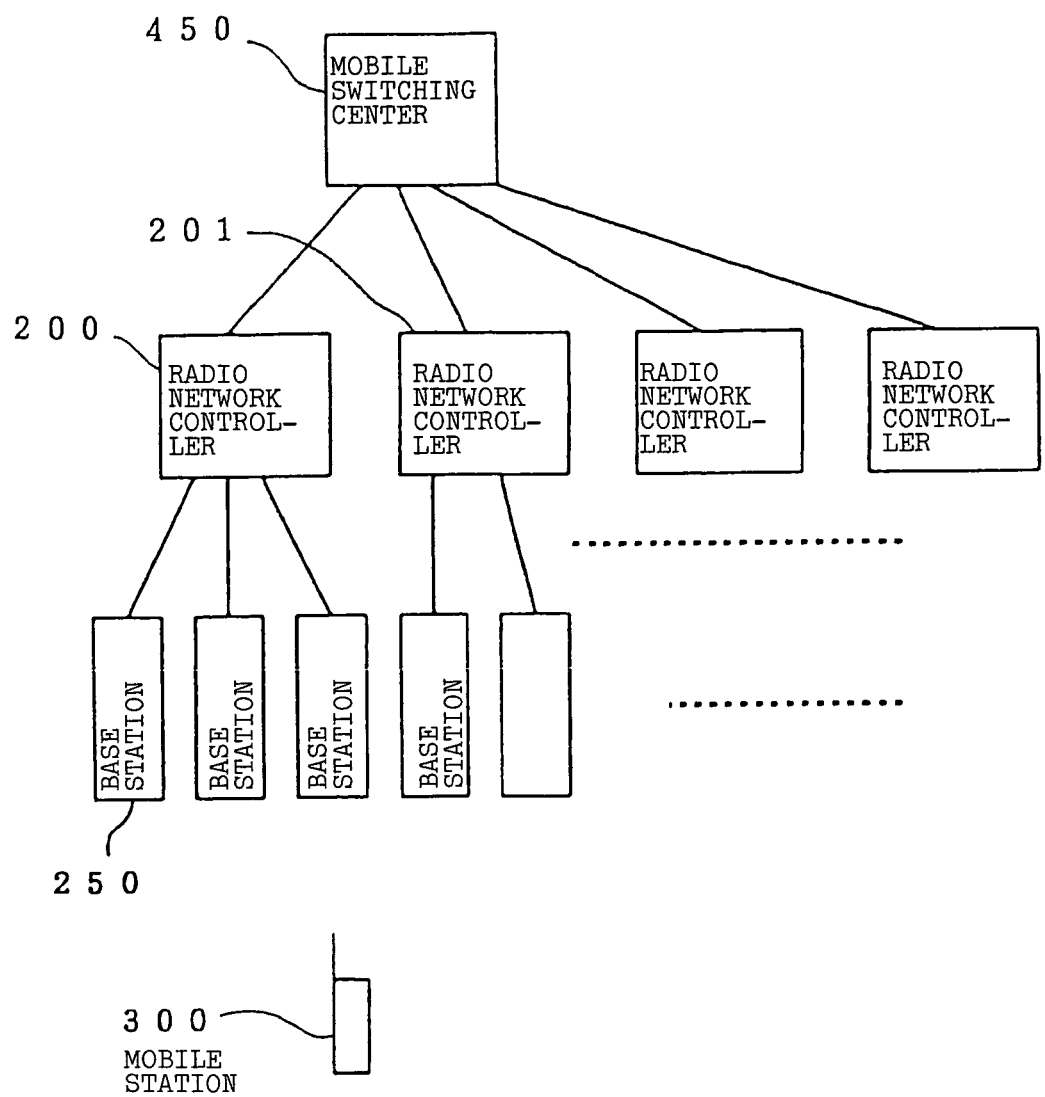
FIG. 15 is a diagram showing connections among a mobile switching center included in a core network, radio network controllers, and base stations.

As shown in FIG. 15, it is assumed that a plurality of radio network controllers 200, 201, . . . are connected to a mobile switching center 450 included in a core network and that base stations 250 are connected to each of the radio network controllers 200. In this state, by employing this system, the amount of processes for searching for the common ID of the mobile station 300 is reduced in the paging procedure at each of the radio network controllers 200, as described above.

Furthermore, referring to the figure, when a paging request arrives at the mobile switching center 450, if the paging area spans across the radio network controller 200 and the radio network controller 201, the mobile switching center 450 transmits paging messages (core to base) to the radio network controller 200 and the radio network controller 201, necessitating searching processing at both of the radio network controllers. However, by employing this system, the connection with the mobile station 300 can be identified as residing at the radio network controller 200, and thus no paging message (core to base) is transmitted to the radio network controller 201. That is, transmission of a useless paging message (core to base) to the radio network controller 201 is prevented. Accordingly, only the radio network controller associated with the connection is required to search for the common ID, and the other radio network controllers are not required to execute useless processes, serving to avoid occurrence of congestion.

In a paging system according to a third embodiment of the present invention, two types of messages, namely, paging 1' message (core to base) and paging 2 message (core to base), are used as paging messages (core to base) of the RANAP protocol. FIG. 16 shows the configuration of the paging 1' message (core to base), and FIG. 17 shows the configuration of the paging 2 message (core to base), respectively.

In the paging 1' message (core to base) shown in FIG. 16, a "search-not-required flag" is added to the information elements of the paging message shown in FIG. 1. The search-not-required flag is a flag for notifying a radio network controller from a core network of whether or not it is required to search whether or not an RRC connection for a mobile station has been established at the radio network controller.

The paging 2 message (core to base) shown in FIG. 17 is the same message as the one shown in FIG. 6, and is a new message that is completely different from the paging message (core to base) shown in FIG. 1. The paging 2 message (core to base) does not have any information element.

A separated core network and a combined core network without coordination function use only the paging 1' message (core to base) (FIG. 16). A combined core network with coordination function uses either both the paging 1' message (core to base) (FIG. 16) and the paging 2 message (core to base) (FIG. 17) or only the paging 1' message (core to base) (FIG. 16).

More specifically, the paging 1' message (core to base) (FIG. 16) is used when the first paging (an RRC connection has not been established for the mobile station) is reliably assumed or when a possibility of the first paging exists. On the other hand, the paging 2 message (core to base) (FIG. 17) is used when the second or a subsequent paging (an RRC connection has been established for the mobile station) is reliably assumed.

First, a paging processing from a core network without coordination function will be described with reference to FIG. 18. In the figure, parts that are equivalent to those in FIG. 2 are designated by the same symbols.

Figure 18:
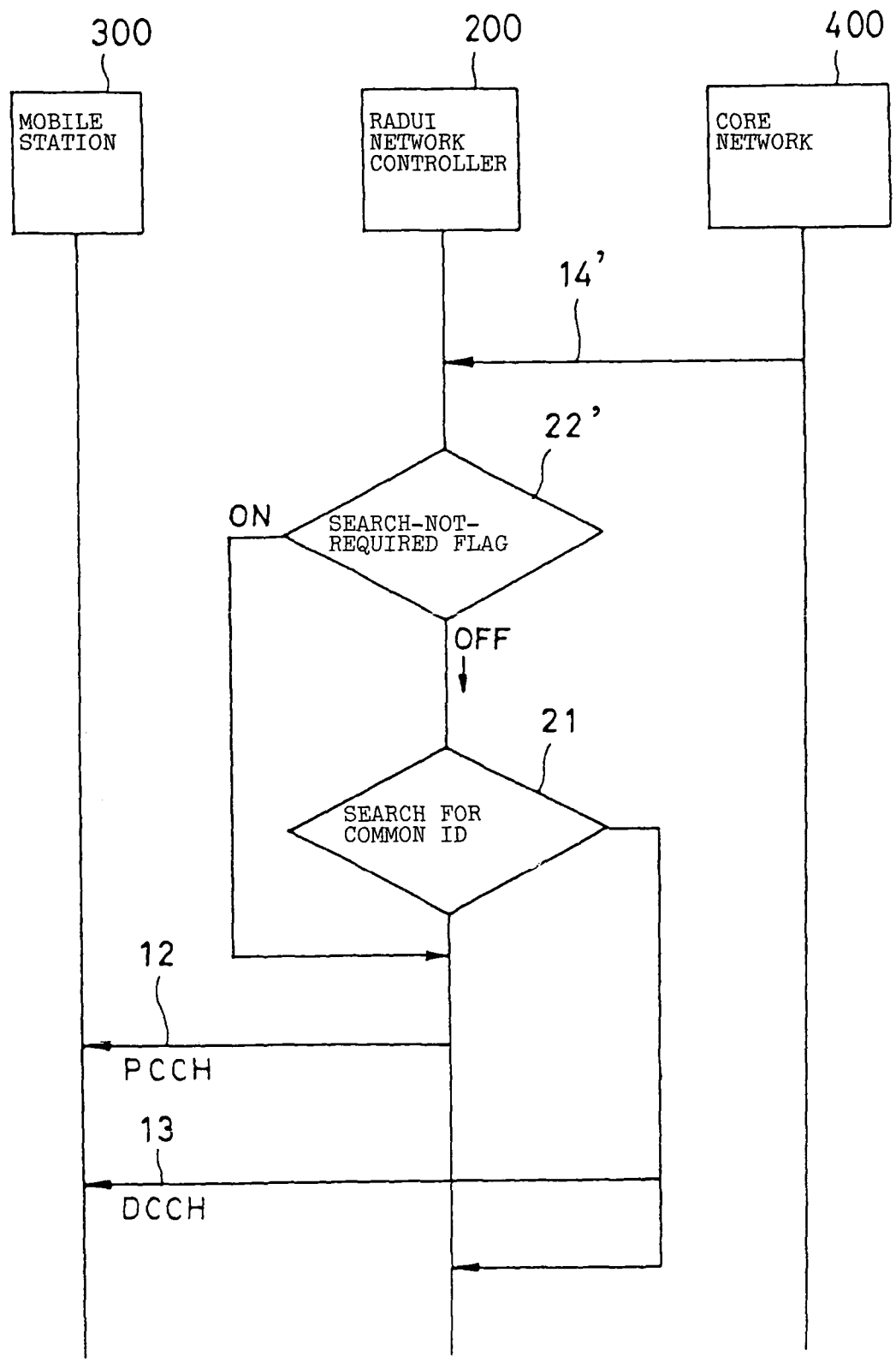
FIG. 18 is a diagram showing a paging 1 sequence in the paging system according to the third embodiment of the present invention.

FIG. 18 shows the operations of a core network 400, a radio network controller 200, a mobile station 300, and messages exchanged.

The core network 400 without coordination function transmits a paging 1' message (core to base) 14' (FIG. 16) to the radio network controller 200 in a connectionless manner. At this time, the search-not-required flag in the paging 1' message (core to base) 14' is set to "OFF."

Upon receiving the paging 1' message (core to base) 14', the radio network controller 200 checks the search-not-required flag in the message (step 22' in FIG. 18). Inasmuch as the search-not-required flag is "OFF," a next common ID is searched for and checked (step 21 in FIG. 18). The subsequent sequence is similar as that in the conventional system. In this case, the presence/absence of an RRC connection is determined based on the table shown in FIG. 3, that is, the table indicative of associations between common IDs and RRC connections, and a paging 1 message (PCCH) 12 or a paging 2 message (DCCH) 13 of the RRC protocol is transmitted to the mobile station 300.

Next, a paging processing from a core network with coordination function will be described with reference to FIGS. 19 to 22. First, a case where an RRC connection has not been established for a destination mobile station, that is, a case of the first paging message, will be described with reference to FIGS. 19 and 20.

Figure 19:
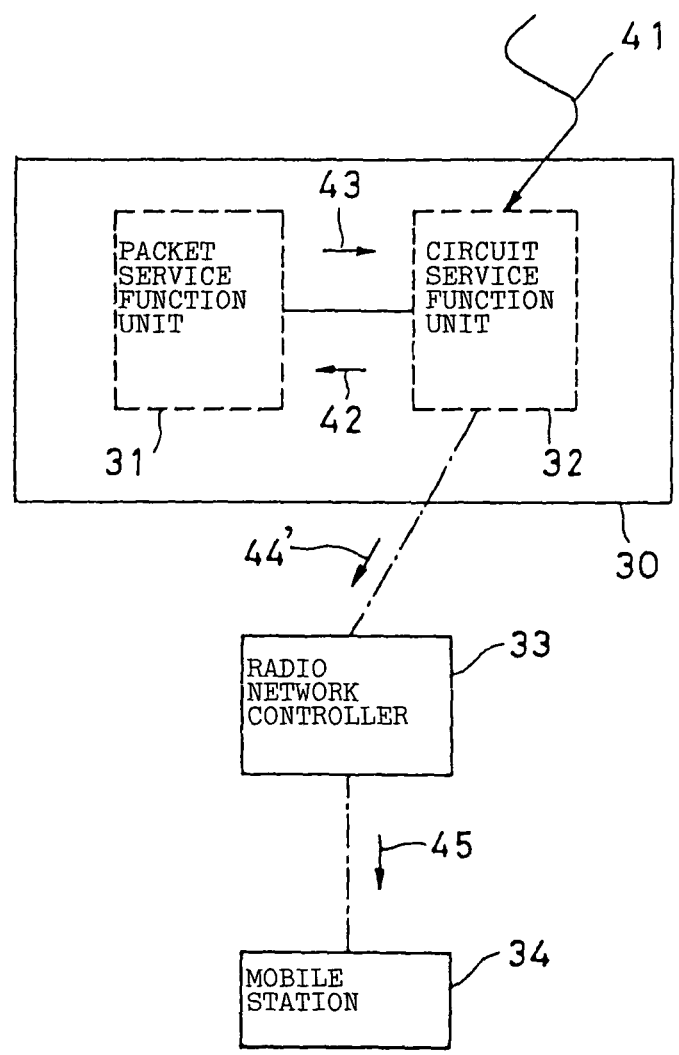
FIG. 19 is a diagram showing a paging sequence from a combined core network.

FIG. 19 shows an example in which a circuit switched call to a mobile station 34 that is not busy in a communication is received. When a circuit switched call is received at a mobile switching center 30 included in a core network 400 (FIG. 18), a circuit service function unit 32 transmits a query 42 as to "whether or not the destination mobile station is busy in a communication" to a packet service function unit 31. Then, the circuit service function unit 32 receives a reply 43 to the effect that "the mobile station 34 is not busy in a communication" from the packet service function unit 31 and recognizes the first paging.

Figure 20:
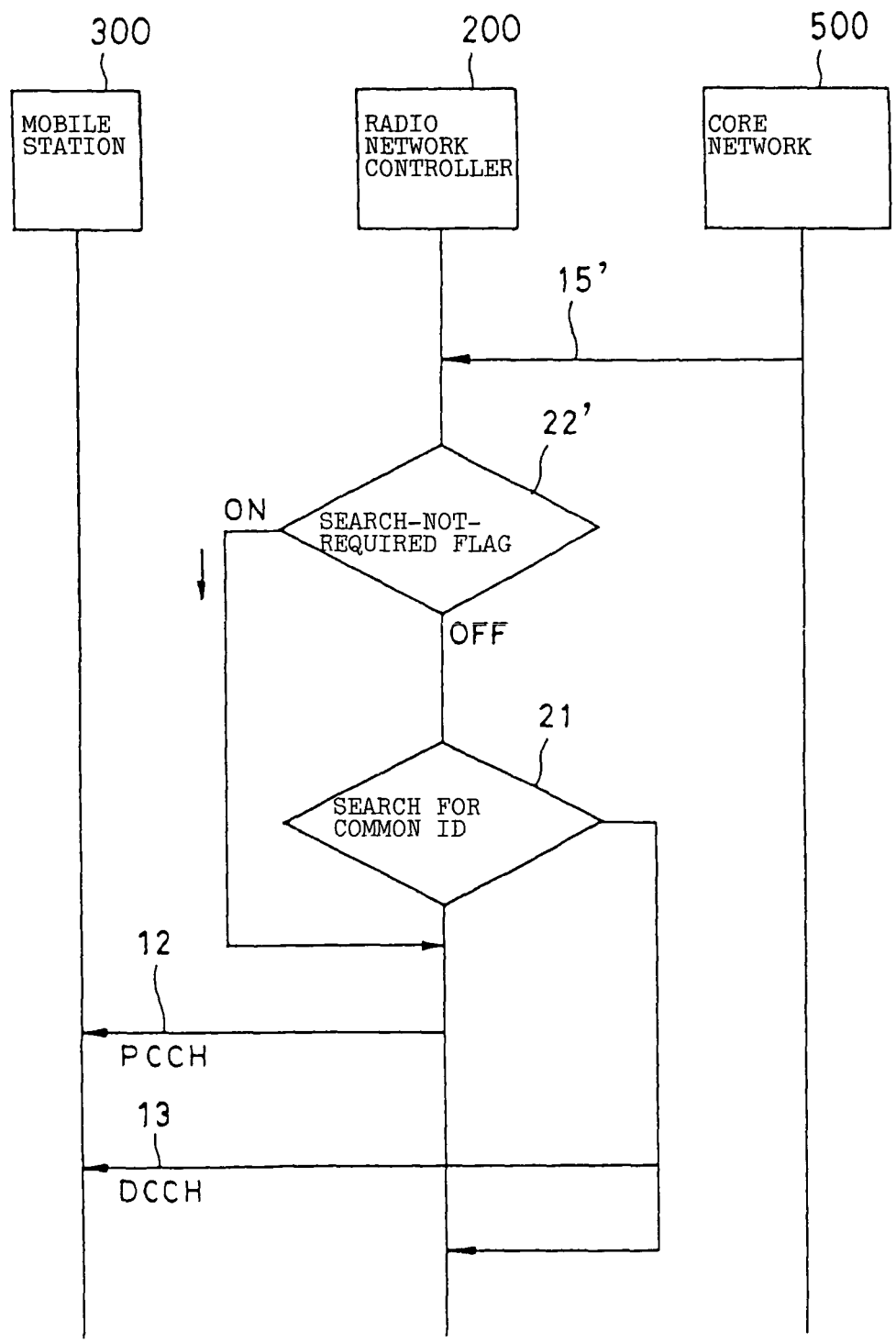
FIG. 20 is a diagram showing a paging 1 sequence in the paging system according to the third embodiment of the present invention.

The circuit service function unit 32 prepares a paging 1' message (core to base) (FIG. 16), sets the search-not-required flag "ON" to indicate that "a search has already been performed" and that "an RRC connection has not been established for the mobile station 34", and transmits the paging 1' message (core to base) 44' (FIG. 16) to the radio network controller 33 by connectionless SCCP. FIG. 20 shows the operation of the radio network controller that has received the paging 1' message (core to base) 44'.

Referring to FIG. 20, upon receiving the paging 1' message (core to base) 15' (FIG. 16) from the core network 500, the radio network controller 200 checks the value of the search-not-required flag in the message (step 22' in FIG. 20). Inasmuch as the search-not-required flag is "ON," the processing of searching for the common ID is skipped, and a paging 1 message (PCCH) 12 of the RRC protocol is transmitted to the mobile station 300 via a paging control channel. Referring back to FIG. 19, the paging 1 message (PCCH) 45 (12 in FIG. 20) has been transmitted from the radio network controller 33 to the mobile station 34.

That is, if the message received from the core network 500 is a paging 1' message (core to base) (FIG. 16) and if the search-not-required flag is "ON," the radio network controller 200 determines that an RRC connection has not been established for the mobile station 300 (connectionless). Thus, a search for the common ID is not required.

Next, a case where an RRC connection has already been established for a destination mobile station will be described with reference to FIGS. 21 and 22.

Figure 21:
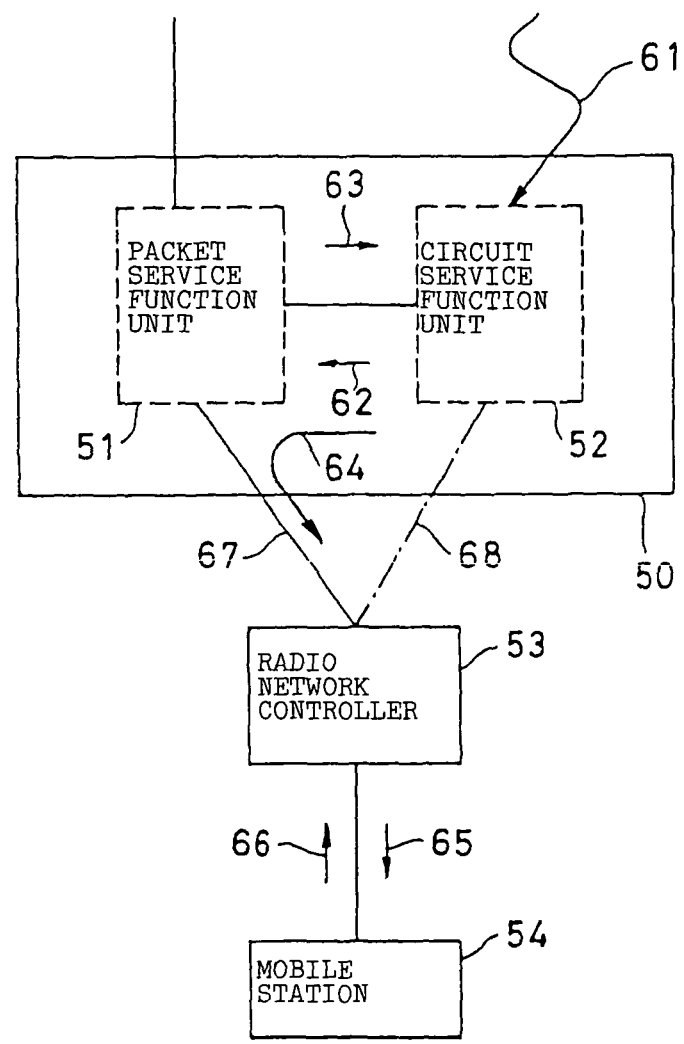
FIG. 21 is a diagram showing a paging sequence from a combined core network.

FIG. 21 shows an example in which a circuit switched call to a mobile station 54 that is busy in a packet service communication is received. When a circuit switched call 61 is received at a mobile switching center 50 included in a core network 500 (FIG. 22), a circuit service function unit 52 transmits a query 62 as to "whether or not the destination mobile station is busy in a communication" to a packet service function unit 51. Then, the circuit service function unit 52 receives a reply 63 to the effect that "the mobile station 54 is busy in a communication" and recognizes that the mobile station 54 has already established an RRC connection. The circuit service function unit 52 prepares a paging 2 message (core to base) (FIG. 17), and transmits the paging 2 message (core to base) 64 (FIG. 17) to a radio network controller 53 in a connection oriented manner with reference to an SCCP connection that has already been already established for a packet call between the mobile switching center 50 and the radio network controller 53. FIG. 22 shows the operation of the radio network controller that has received the paging 2 message (core to base) 64.

Figure 22:
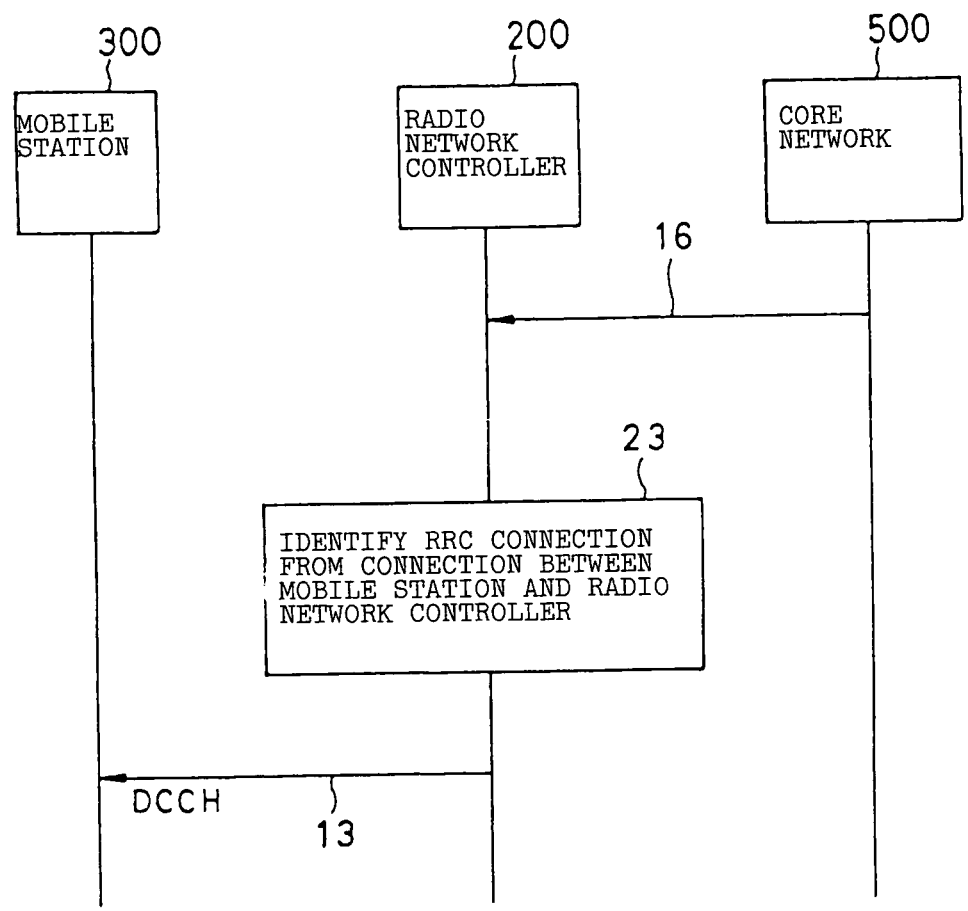
FIG. 22 is a diagram showing a paging 2 sequence in the paging system according to the third embodiment of the present invention.

Referring to FIG. 22, upon receiving the paging 2 message (core to base) 16 (FIG. 17) from the core network 500, the radio network controller 200 identifies which of a plurality of RRC connections is the RRC connection for the mobile station 300 based on the SCCP connection between the core network 500 and the radio network controller 200 (step 23 in FIG. 22). Then, the radio network controller 200 transmits a paging 2 message (DCCH) 13 of the RRC protocol that has been identified to the mobile station 300 via a dedicated control channel DCCH.

Referring back to FIG. 21, the paging 2 message (DCCH) 65 (13 in FIG. 22) has been transmitted from the radio network controller 53 to the mobile station 54. A response 66 from the mobile station 54 may be returned either using the SCCP connection 67 for a packet call between the mobile switching center 50 and the radio network controller 53 or by a new SCCP connection establishing request 68 for a circuit switched call between the mobile switching center 50 and the radio network controller 53.

That is, if the message received from the core network 500 is a paging 2 message (core to base) (FIG. 17), the radio network controller 200 determines that an RRC connection has been established for the mobile station 300 (connection oriented). Thus, a search for the common ID is not required. Furthermore, in this case, checking of the search-not-required flag is not required either.

As described above, two types of paging message (core to base) with respect to the coordination function of core networks are newly provided so that means are provided for transmitting information recognized by a core networks to a radio network controller, allowing the radio network controller to determine whether or not a search for a common ID is required based on the information. Accordingly, the amount of processes for searching for a common ID in a paging procedure at the radio network controller is reduced.

Next, another embodiment of a case where an RRC connection has already been established for a destination mobile station will be described with reference to FIGS. 20 and 23. As opposed to the example described above, even if the core network has coordination function and if an RRC connection has already been established for a destination mobile station, the paging 2 message (core to base) (FIG. 17) is not used, and the search-not-required flag in the paging 1' message (core to base) (FIG. 16) is set to "OFF," so that the radio network controller searches for the common ID.

Figure 23:
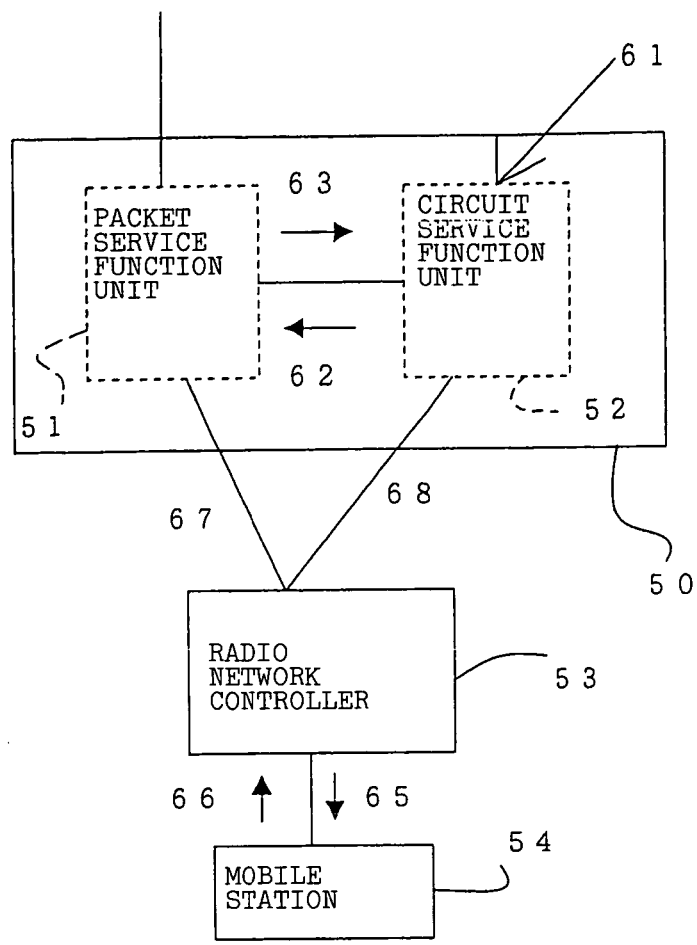
FIG. 23 is a diagram showing a paging sequence for explaining an embodiment relating to a case where an RRC connection has already been established for a destination mobile station.

FIG. 23 shows an example in which a circuit switched call to a mobile station 54 that is busy in a packet service communication is received. When a circuit switched call 61 is received at a mobile switching center 50 included in a core network 400, a circuit service function unit 52 transmits a query 62 as to "whether or not the destination mobile station is busy in a communication" to a packet service function unit 51. Then, the circuit service function unit 52 receives a reply 63 to the effect that "the mobile station 54 is busy in a communication" and recognizes that the mobile station 54 has already established an RRC connection. At this time, the circuit service function unit 52 sets the search-not-required flag in the paging 1' message (core to base) 15' (FIGS. 20 and 16) to "OFF."

Upon receiving the paging 1' message (core to base) 15' (FIG. 16), the radio network controller 200 checks the search-not-required flag in the message (step 22' in FIG. 20). Inasmuch as the search-not-required flag is "OFF," a next common ID is searched and checked (step 21 in FIG. 20). The subsequent sequence is similar as that in the conventional system. In this case, whether the presence/absence of an RRC connection is determined based on the table shown in FIG. 3, that is, the table indicative of associations between common IDs and RRC connections, and a paging 1 message (PCCH) 12 or a paging 2 message (DCCH) 13 of the RRC protocol is transmitted to the mobile station 300. In this case, inasmuch as an RRC connection has already been set up for the mobile station, the paging 2 message (DCCH) 13 is transmitted to the mobile station 300.

Referring back to FIG. 23, the paging 2 message (DCCH) 65 (13 in FIG. 20) has been transmitted from the radio network controller 53 to the mobile station 54. A response 66 from the mobile station 54 is returned by a new SCCP connection establishing request 68 for a circuit switched call between the mobile switching station 50 and the radio network controller 53.

That is, if the search-not-required flag in the paging 1' message (core to base) (FIG. 16) is "OFF," even if the message received from the core network 500 is a paging 1' message (core to base) (FIG. 16), the radio network controller 200 determines that an RRC connection has been established for the mobile station 300 and thus searches for the common ID.

Next, a fourth embodiment of the present invention will be described with reference to FIGS. 24 to 26.

FIG. 24 shows the configuration of a paging 2' message (core to base) according to the fourth embodiment of the paging 2 message (core to base), which is identical to the message shown in FIG. 12. As opposed to the message described earlier and shown in FIG. 17, the message is transmitted by connectionless SCCP and a connection ID is added to the information elements.

Figure 25:
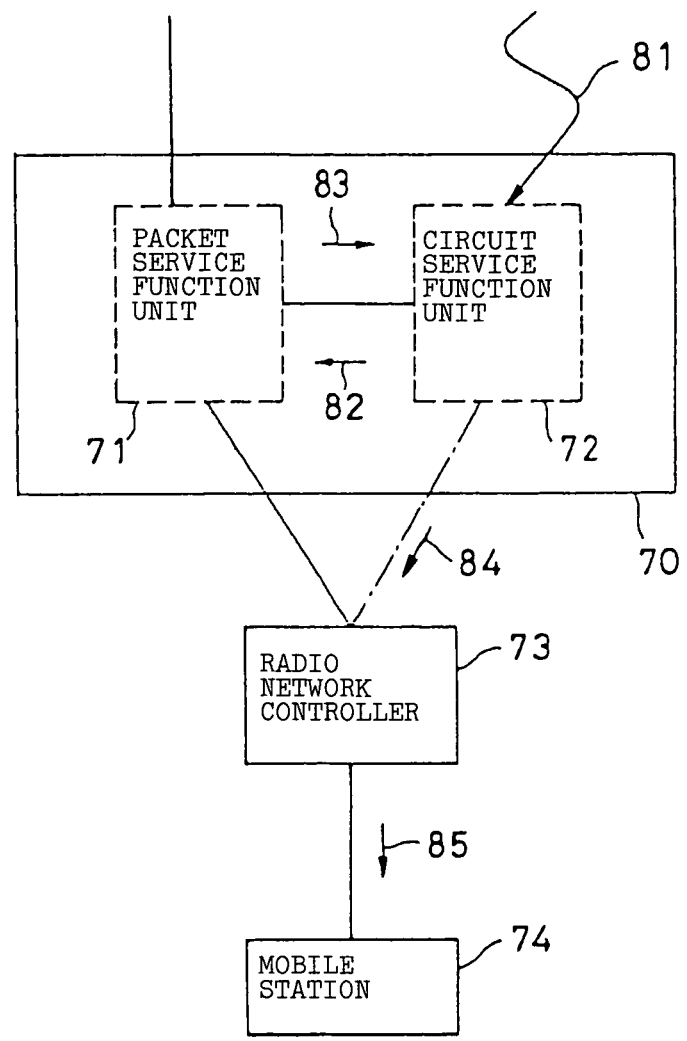
FIG. 25 is a diagram showing a paging sequence from a combined core network.

FIG. 25 shows an example in which a circuit switched call to a mobile station 74 that is busy in a packet service communication is received. When a circuit switched call 81 is received at a mobile switching center 70 included in a core network, a circuit service function unit 72 transmits a query 82 as to "whether or not the destination mobile station is busy in a communication" to a packet service function unit 71. Then, the circuit service function unit 72 receives a reply 83 to the effect that "the mobile station 74 is busy in a communication" from the packet service function unit 71 and recognizes that the mobile station 74 has already established an RRC connection. The circuit service function unit 72 sets a connection ID indicating an SCCP connection that has been established for a packet call between the mobile switching center 70 and a radio network controller 73 in a paging 2' message (core to base) (FIG. 24), and transmits the paging 2' message (core to base) 84 (FIG. 24) to the radio network controller 73 in a connectionless manner.

Figure 26:
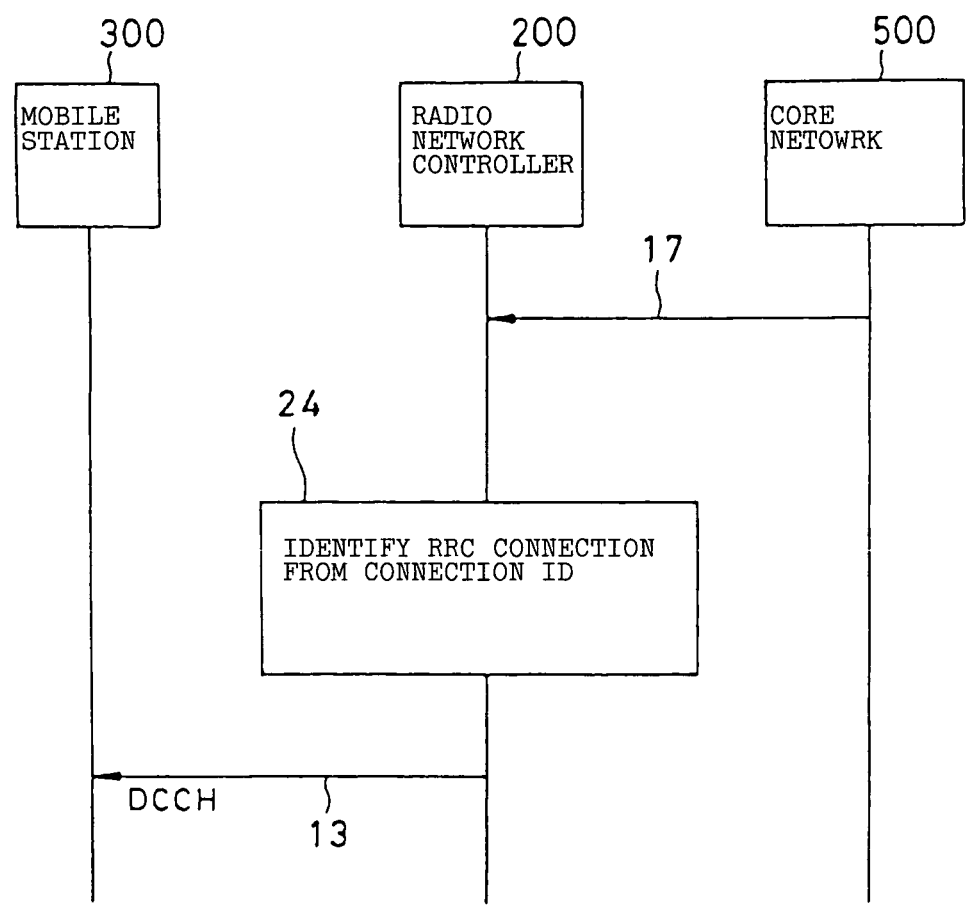
FIG. 26 is a diagram showing a paging 2' sequence in the paging system according to the fourth embodiment of the present invention.

FIG. 26 shows the operation of the radio network controller that has received the paging 2' message (core to base) 84. Referring to FIG. 26, upon receiving the paging 2' message (core to base) 17 (FIG. 24) from the core network 500, the radio network controller 200 identifies the RRC connection for the mobile station 300 from the connection ID in the message (step 24 in FIG. 26), and transmits a paging 2 message (DCCH) 13 of the RRC protocol via a dedicated control channel DCCH. Referring back to FIG. 25, the paging 2 message (DCCH) 85 (13 in FIG. 26) has been transmitted from the radio network controller 73 to the mobile station 74.

That is, if the message received from the core network 500 is a paging 2' message (core to base) (FIG. 24), the radio network controller 200 determines that an RRC connection has been established for the mobile station 300 similarly to the case of paging 2. Thus, a search for the common ID is not required either in this case. Furthermore, checking of the search-not-required flag is not required either in this case.

As described above, also in this embodiment, two types of paging message (core to base) are provided so that information recognized by a core network is transmitted to a radio network controller, allowing determination as to whether or not a search for a common ID is required based on the information. Accordingly, the amount of processes for searching for a common ID in a paging procedure at the radio network controller is reduced.

The operations described above are summarized in FIG. 27. FIG. 27 is a diagram showing the operations of the paging systems according to the third and the fourth embodiments. Referring to the figure, a search for the common ID is required if the search-not-required flag is "OFF," whereas if the search-not-required flag is "ON" and if the message transmitted from the core network to the radio network controller is paging 1', it is determined that an RRC connection has not been established for the mobile station and thus a search for the common ID is not required.

In the case of paging 2, it is determined that an RRC connection has been established for the mobile station and thus a search for the common ID is not required either in this case.

Furthermore, in the case of paging 2', similarly to the case of paging 2, it is determined that an RRC connection has been established for the mobile station and thus a search for the common ID is not required.

Figure 28:
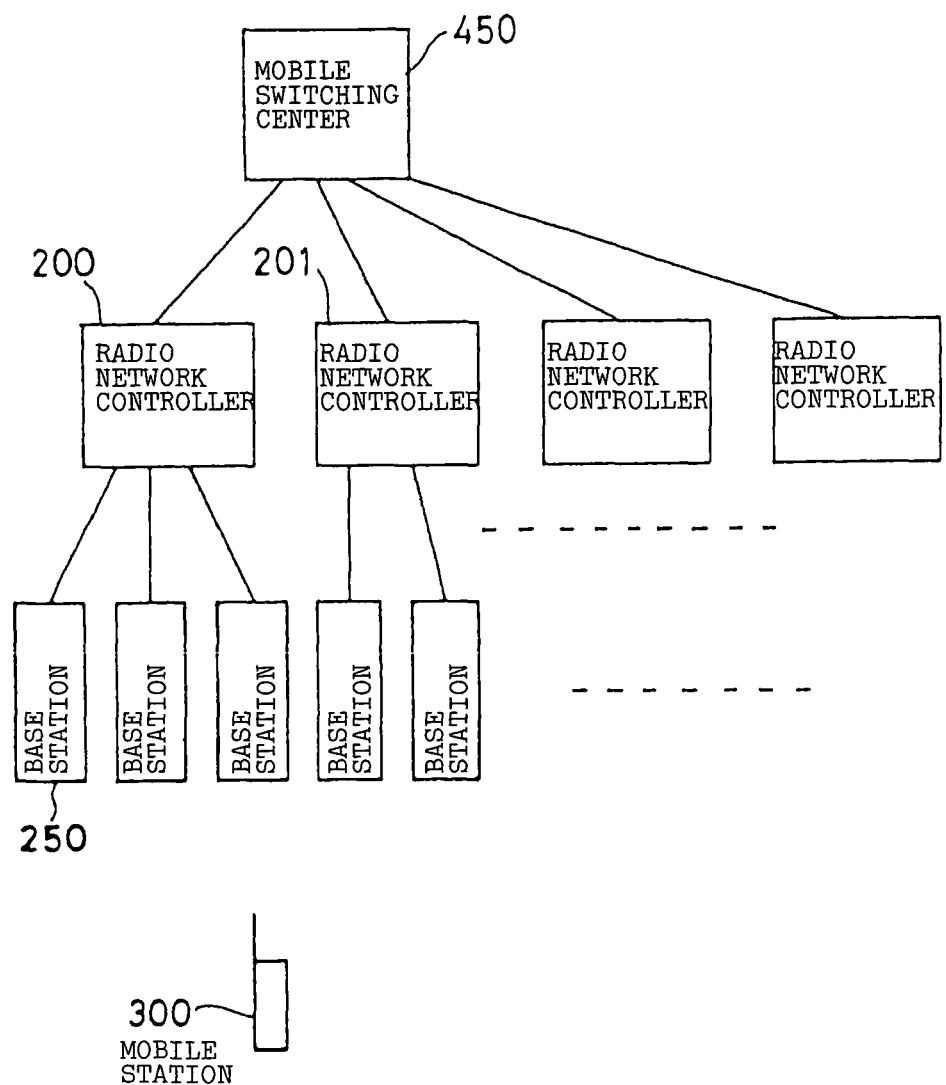
FIG. 28 is a diagram showing connections among a mobile switching center included in a core network, radio network controllers, and base stations.

It is assumed that, as shown in FIG. 28, a plurality of radio network controllers 200, 201, . . . is connected to a mobile switching center 450 included in a core network, and base stations 250 are connected to each of the radio network controllers 200. In this state, by employing this system, the amount of processes for searching for the common ID of the mobile station 300 in the paging procedure at each of the radio network controllers 200 is reduced, as described above.

Furthermore, referring to the figure, when a paging request arrives at the mobile switching center 450, if the paging area spans across the radio network controller 200 and the radio network controller 201, the mobile switching center transmits paging messages (core to base) to the radio network controllers 200 and 201, necessitating searching processing at both of the radio network controllers. However, by employing this system, the connection with the mobile station 300 can be identified as residing at the radio network controller 200, and no paging message (core to base) is transmitted to the radio network controller 201. That is, transmission of a useless paging message (core to base) to the radio network controller 201 is prevented. Accordingly, only the radio network controller associated with the connection is required to search for the common ID, and the other radio network controllers are not required to perform useless processes, serving to avoid occurrence of congestion.

What is claimed is:

1. A paging system comprising:
    a mobile station;
    a core network;
    a radio network controller provided on a radio network and that performs a paging processing for paging said mobile station in response to a paging message from said core network,
    wherein said paging message includes a search-not-required flag indicating that a search for a common ID, wherein the common ID is used for determining if an RRC connection is associated with said mobile station, is not required in said radio network controller, and
    wherein said core network comprises a first core network node and a second core network node, and comprises a coordination function for handling the paging message from the first core network node when the mobile station has a connection to the second core network node.

2. A paging system according to claim 1, wherein said radio network controller performs said paging processing using the paging control channel (PCCH) without searching for said common ID.

3. A paging system according to claim 1, wherein said radio network controller does not carry out the search for said common ID.

4. A paging system according to claim 1, wherein said radio network controller determines whether or not the RRC connection is associated with said mobile station, based solely on information included in said paging message.

5. A paging system according to claim 1, wherein said paging message that does not include the search-not-required flag is sent out by said core network to said radio network controller due to a circuit service function of said radio network controller already having performing the search for the common ID.

6. A paging method comprising:
    receiving a paging message from a core network, said paging message including a search-not-required flag indicating that a search for a common ID, wherein the common ID is used for determining if an RRC connection is associated with a mobile station, is not required in a radio network controller; and
    processing said paging message;
    whereby processing said paging message includes paging said mobile station from said radio network controller, and
    wherein said core network comprises a first core network node and a second core network node, and comprises a coordination function for handling the paging message from the first core network node when the mobile station has a connection to the second core network node.

7. A paging method according to claim 6,
    further comprising a paging processing step of performing, in said radio network controller, paging processing using a paging control channel (PCCH) without searching for said common ID.

8. A paging method according to claim 6, wherein said radio network controller does not carry out the search for said common ID.

9. A paging method according to claim 6, wherein said receiving step comprises determining, by said radio network controller, whether or not the RRC connection is associated with said mobile station, based solely on information included in said paging message.

10. A paging method according to claim 6, wherein said paging message that does not include the search-not-required flag is sent out by said core network to said radio network controller due to a circuit service function of said radio network controller already having performing the search for the common ID.

11. A radio network controller that performs a paging processing for paging a mobile station in response to a paging message from a core network,
wherein said paging message includes a search-not-required flag indicating that a search for a common ID, wherein the common ID is used for determining if an RRC connection is associated with said mobile station, is not required in a radio network, and
wherein said core network comprises a first core network node and a second core network node, and comprises a coordination function for handling the paging message from the first core network node when the mobile station has a connection to the second core network node.

12. A radio network controller according to claim 11, wherein said radio network controller does not carry out the search for said common ID.

13. A radio network controller according to claim 11, wherein said radio network controller performs said paging processing using the paging control channel (PCCH) without searching for said common ID.

14. A radio network controller according to claim 11, wherein said radio network controller determines whether or not the RRC connection is associated with said mobile station, based solely on information included in said paging message.

15. A radio network controller comprising:
a receiving means for receiving a paging message from a core network; and
a paging means for paging a mobile station in response to said paging message;
wherein said paging message includes a search-not-required flag indicating that a search for a common ID, wherein the common ID is used for determining if an RRC connection is associated with said mobile station, is not required in a radio network, and
wherein said core network comprises a first core network node and a second core network node, and comprises a coordination function for handling the paging message from the first core network node when the mobile station has a connection to the second core network node.

16. A radio network controller according to claim 15, wherein said radio network controller performs said paging processing using the paging control channel (PCCH) without searching for said common ID.

17. A radio network controller according to claim 15, wherein said radio network controller does not carry out the search for said common ID.

18. A radio network controller according to claim 15, wherein further comprises determining means for determining whether or not the RRC connection is associated with said mobile station, based solely on information included in said paging message.

19. A mobile station comprising:
a receiver being adapted to receive a paging information from a radio network controller, wherein said radio network controller performs a paging processing for paging the mobile station in response to a paging message from a core network; and
wherein said paging message includes a search-not-required flag indicating that a search for a common ID, wherein the common ID is used for determining if an RRC connection is associated with said mobile station, is not required in said radio network controller, and
wherein said core network comprises a first core network node and a second core network node, and comprises a coordination function for handling the paging message from the first core network node when the mobile station has a connection to the second core network node.

* * * * *